(12) United States Patent
Saba et al.

(10) Patent No.: US 6,532,931 B1
(45) Date of Patent: Mar. 18, 2003

(54) DISENGAGEMENT DETECTING SYSTEM FOR JOINT PORTION

(75) Inventors: Toshikazu Saba, Yokkaichi (JP); Yasuhiko Hamada, Shinjuku-ku (JP)

(73) Assignees: Sumitomo Wiring Systems, Ltd., Mie (JP); Fuji Jukogyo Kabushiki Kaisha, Tokyo (JP)

( * ) Notice: Subject to any disclaimer, the term of this patent is extended or adjusted under 35 U.S.C. 154(b) by 140 days.

(21) Appl. No.: 09/698,000

(22) Filed: Oct. 27, 2000

(30) Foreign Application Priority Data

Nov. 9, 1999 (JP) ............................................ 11-318505

(51) Int. Cl.[7] .............................................. F02B 77/00
(52) U.S. Cl. ............................. 123/198 D; 123/568.11
(58) Field of Search .................... 123/568.11, 198 D; 439/489, 488, 352; 204/485

(56) References Cited

U.S. PATENT DOCUMENTS

| | | | |
|---|---|---|---|
| 5,601,450 A | * | 2/1997 | Nabeshima et al. ......... 439/489 |
| 5,609,144 A | * | 3/1997 | Seizew et al. .......... 123/568.11 |
| 5,671,600 A | * | 9/1997 | Pischinger et al. .... 123/568.11 |
| 5,894,726 A | * | 4/1999 | Monnier ................. 123/568.11 |
| 6,024,595 A | * | 2/2000 | Sabo et al. .................. 439/489 |
| 6,290,829 B1 | * | 9/2001 | Kato et al. .................... 204/425 |

FOREIGN PATENT DOCUMENTS

JP 64-16080 1/1989
JP 3-190068 8/1991

* cited by examiner

*Primary Examiner*—Willis R. Wolfe
*Assistant Examiner*—Jason Benton
(74) *Attorney, Agent, or Firm*—Oliff & Berridge, PLC

(57) ABSTRACT

Joint portions 13, 15 to which tubes 14 are coupled are provided with a pair of connector portions 33, 52 which are engaged/disengaged in accordance with the engagement/ disengagement of the joint portions 13, 15, respectively. Further, a detection circuit 80 is provided which detects the non-conduction state between terminals 70, 33B provided at the connector portions 33, 52, respectively. The detection circuit 80 is arranged to output an alarm signal when the state between the terminal metal members is non-conductive. Thus, when one of the joint portions 13, 15 disengages, the corresponding one of the connector portions 33, 52 also disengages, so that the state between the terminal metal members becomes non-conductive and the alarm signal is generated.

7 Claims, 9 Drawing Sheets

DISENGAGEMENT DETECTING SYSTEM FOR JOINT PORTION

BACKGROUND OF THE INVENTION

The present invention relates to a system for detecting the disengagement of a joint portion provided in a feedback path for blowby gas.

The blowby gas is generated when the mixture gas of the fuel and the air leaks from a portion between the cylinder and the piston of an engine. For example, in the engine for an automobile, the blow by gas is collected and fed back to an intake path of the engine so as to prevent the blowby gas from being emitted in the atmosphere.

When performing the maintenance of the engine room of an automobile, a pipe for feeding back the blowby gas is sometimes removed or disengaged.

However, in the prior art, even when the pipe is kept in the disengaged state, the engine operates and an alarm indication etc. for notifying the removal or disengagement of the pipe is not made. Thus, there may arise such a matter that a driver operates the engine without noticing that the pipe is disengaged thereby to emit the blowby gas in the atmosphere.

SUMMARY OF THE INVENTION

Accordingly, the invention has been made in view of the aforesaid problem of the prior art, and an object of the invention is to provide a disengagement detection system for a joint portion which can detect the disengagement of the joint portion provided at a feedback path for blowby gas.

The Invention of Aspect 1

A disengagement detection system for a joint portion according to aspect 1 is arranged in a manner that in the disengagement detection system wherein a feedback path for deeding back blowby gas to an intake path of an engine is formed by coupling a plurality of cavities, the disengagement detection system is characterized in that joint portions provided at each of a pair of the cavities and mutually coupled are provided with a pair of connector portions which are engaged/disengaged in accordance with engagement/disengagement of the joint portions, respectively, a detection means is provided for detecting a non-conduction state between terminal metal members provided at the connector portions, and the detection means outputs a disengagement detection signal when a state between the terminal metal members is non-conductive.

The Invention of Aspect 2

The invention as in aspect 2 is characterized in that in the disengagement detection system for a joint portion according to aspect 1, plural pairs of the connector portions are provided, the detection means includes a switch circuit which is closed only when all the connector portions are coupled to partner-side connector portions, respectively, and all the terminal metal members are conductively coupled mutually, and the detection means detects that a state between the terminal metal members having been mutually coupled at one of the connector portions becomes non-conductive when the switch circuit is opened.

The Invention of Aspect 3

The invention as in aspect 3 is characterized in that in the disengagement detection system for a joint portion according to aspect 2, the cavity having two the connector portions is provided with a pair of electric paths for connecting, between the two connector portions, the pair of terminal metal members provided at the two connector portions, and the pair of electric paths are arranged to flow currents in opposite direction when sad switch circuit is closed.

Action and Effects of the Invention

The Invention of Aspect 1

According to the arrangement of aspect 1, when the joint portion is disengaged, the connector portion is also disengaged, so that the state between the terminal metal members provided at the connector portions becomes non-conductive. The detection means detects such a non-conductive state thereby to output the disengagement detection signal. Thus, a diver can notice that the joint portion is disengaged.

The Invention of Aspect 2

According to the arrangement of aspect 2, in the case where a plurality of the joint portions are provided at the feedback path for the blowby gas, when even one of the joint portions is disengaged, the switch circuit is opened. Thus, the disengagement of the joint portion can be detected.

The Invention of Aspect 3

According to the arrangement of aspect 3, currents flow in opposite direction in the pair of the electric paths provided in the cavity to constitute outward and homeward paths of the switch circuit, respectively. Thus, the configuration of the switch circuit along the cavity can be simplified as compared with the case where only the outward path is provided between the connector portions provided at the cavity and the homeward path is provided in another portion.

DETAILED DESCRIPTION OF THE PREFERRED EMBODIMENTS

The embodiment of the invention will be explained with reference to FIGS. 1 to 9.

Figure 1:
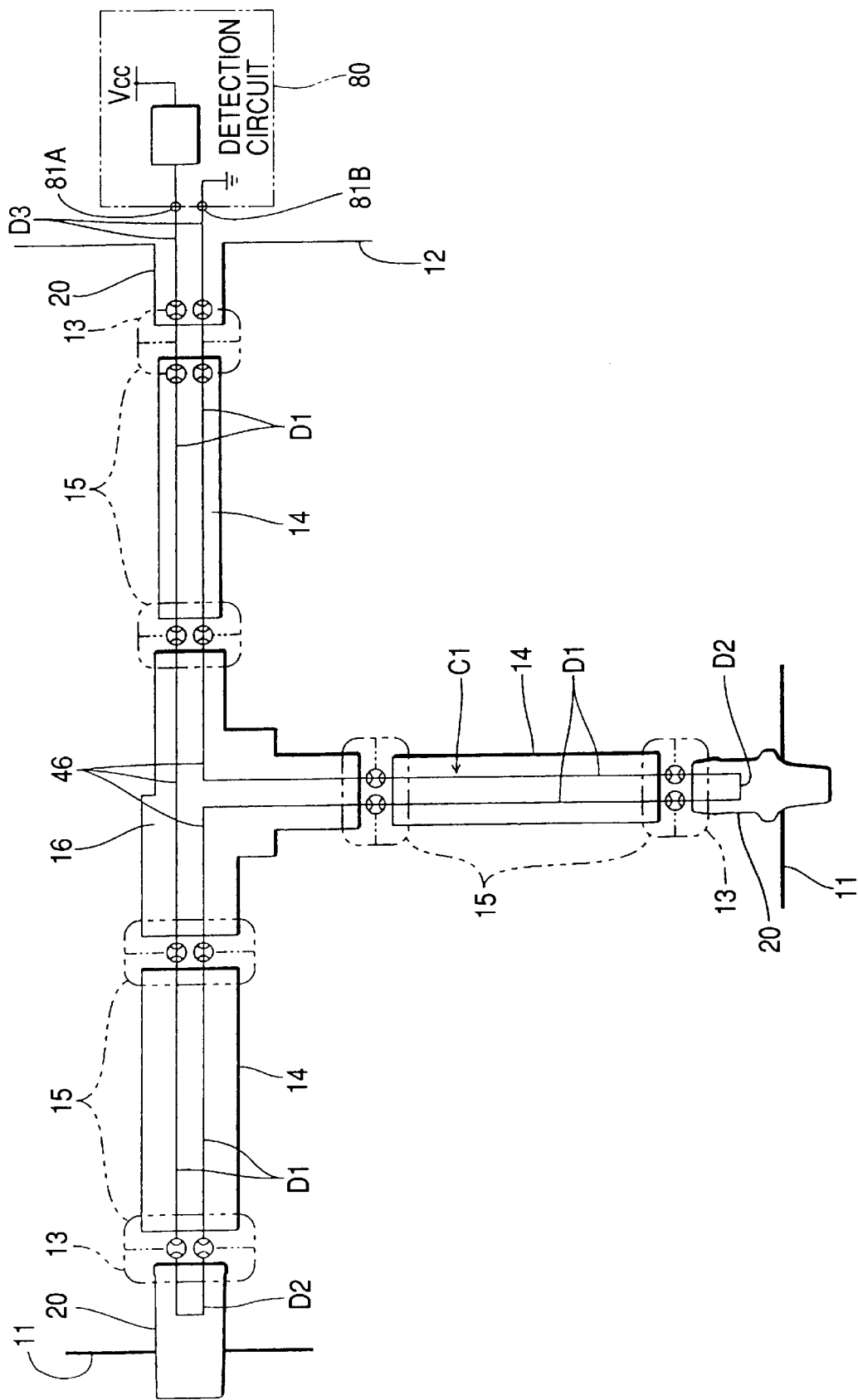
FIG. 1 is a schematic diagram showing a feedback path for blowby gas according to an embodiment of the invention.

FIG. 1 shows a part of a feed back path for feeding back the blowby gas which is provided at the engine of an automobile. The feedback path is formed by tubes 14 which connect between a crank case 11 capable of generating the blowby gas and an intake duct 12 to the engine within the engine.

More specifically, first receiving side joint portions 13 are provided at three portions in total, that is, two portions of the crank case 11 and one portion of the intake duct 12. Each of the tubes 14 is provided at its both ends with insertion side joint portions 15. The insertion side joint portion 15 on the one end side of each of the tubes 14 is coupled to the first receiving side joint portion 13 and the insertion side joint portion 15 on the other end side of each of the tubes 14 is coupled to a T-shaped second receiving side joint portion 16.

Figure 2:
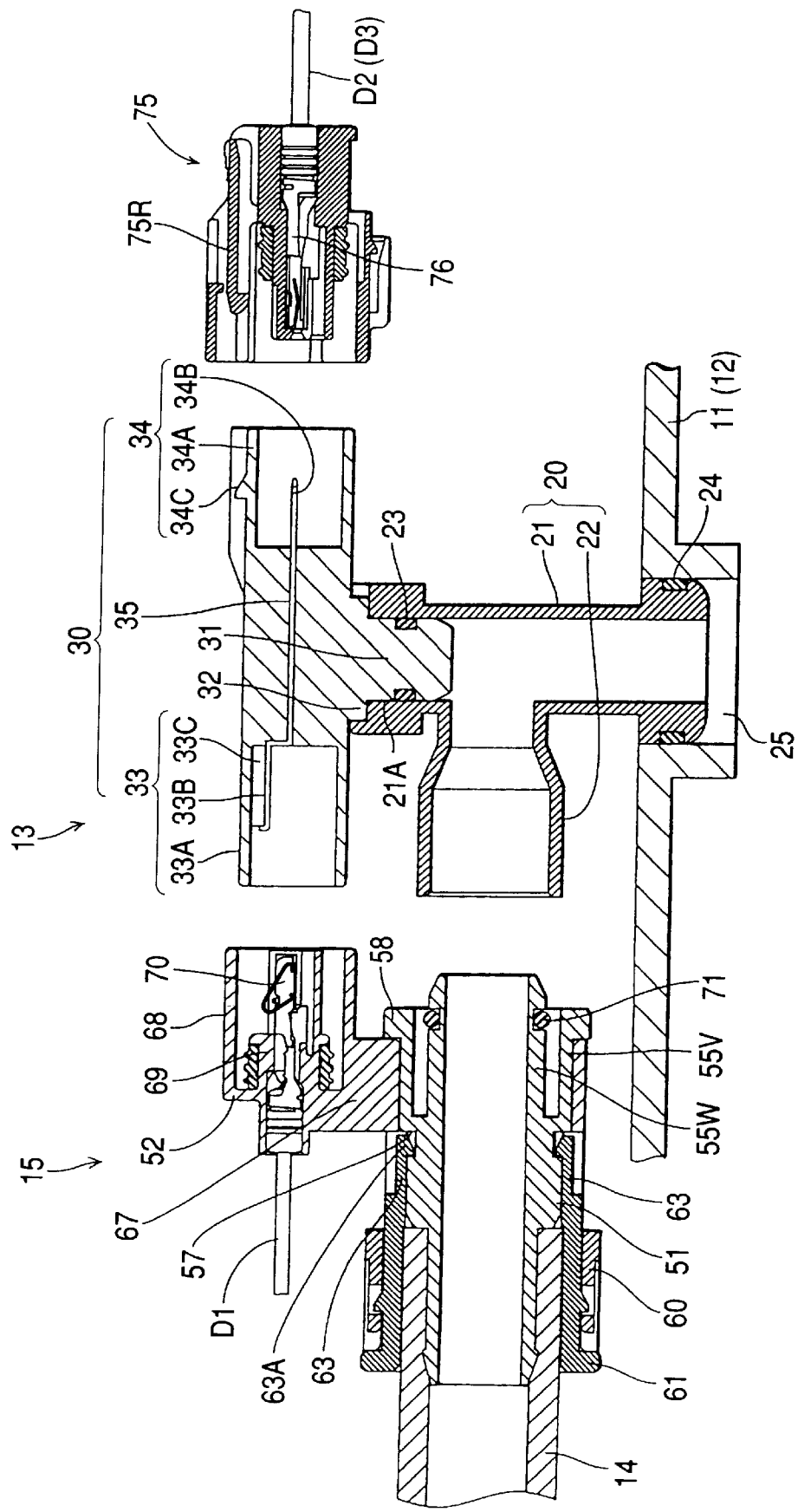
FIG. 2 is a sectional view showing an insertion side joint portion, a first receiving side joint portion and connector portions provided therein.
Figure 3:
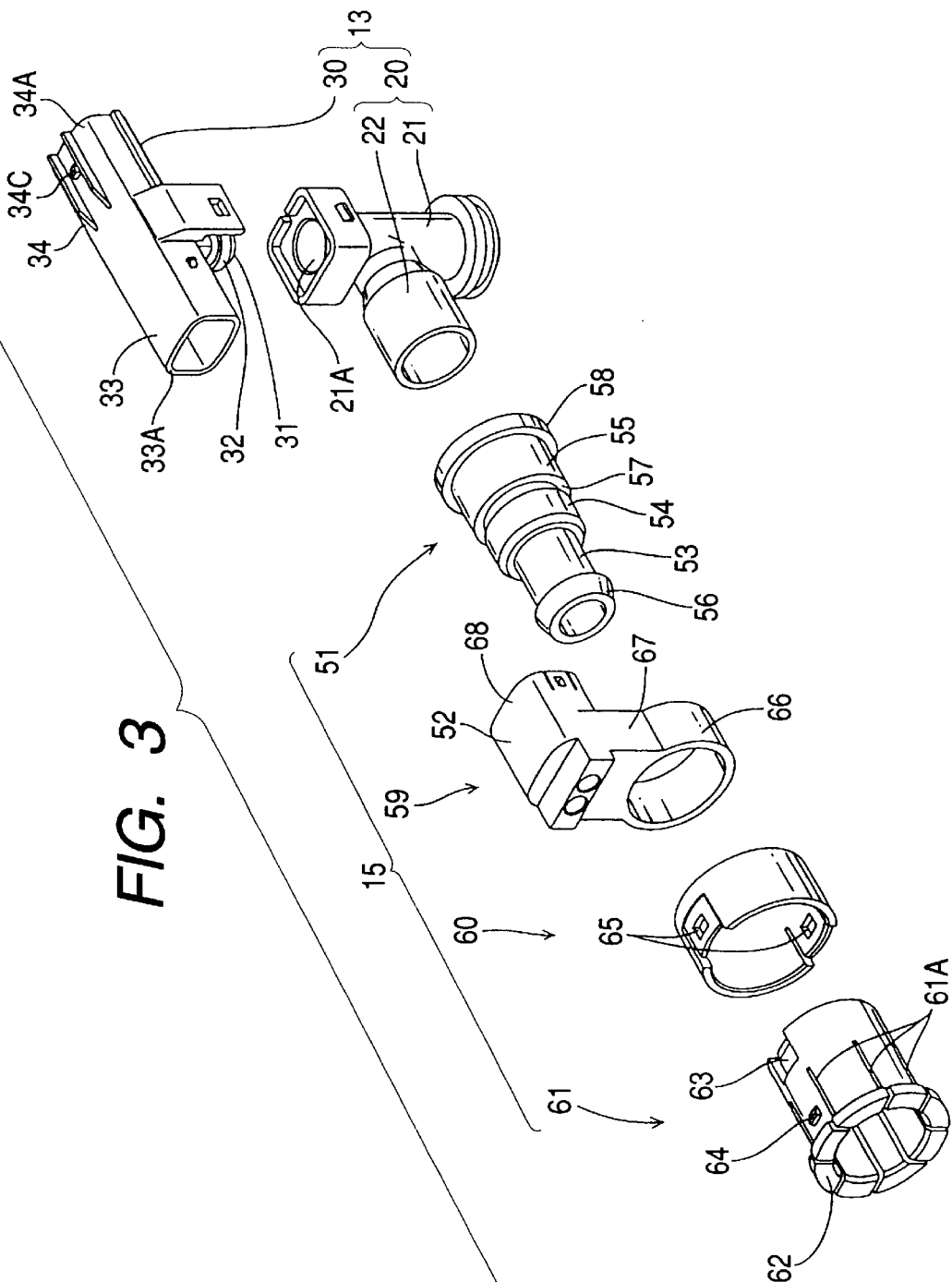
FIG. 3 is an exploded perspective view showing the insertion side joint portion and the first receiving side joint portion.

The insertion side joint portion 15 is formed by composite resin and arranged in a manner as shown in FIG. 2 that a female connector portion 52 is protruded toward the side direction from a main body pipe 51 which is fitted and fixed to the tube 14. The constituent parts of the insertion side joint portion 15 are shown in FIG. 3. That is, the main body pipe 51 includes a small diameter portion 53, a middle diameter portion 54 and a large diameter portion 55 sequentially from the tube 14 side. A disengagement prevention projection 56 is formed at the tip end of the small diameter portion 53 and an engagement groove 57 is formed between the middle diameter portion 54 and the large diameter portion 55.

At the tip end of the large diameter portion 55 on the side thereof away from the middle diameter portion 54, a flange 58 is formed so as to expand toward the side direction. As shown in FIG. 2, the large diameter portion 55 has a duplicated structure in a manner that piping portions 20, 40 provided at the partner-side joint portions 13, 16 are fitted into the clearance between an outer cylindrical wall 55V and an inner cylindrical wall 55W of the large diameter portion. The inner cylindrical wall 55W is slightly protruded to the forward direction from the outer cylindrical wall 55V. An O ring 71 is fittingly coupled at the position near the tip end of the portion of the inner cylindrical wall 55W which is covered by the outer cylindrical wall 55V.

The main body pipe 51 is sequentially fitted with a rotation body 59 and a fastening sleeve 61 from the small diameter portion 53 side. A lock ring 60 is fitted to the external surface of the fastening sleeve 61.

The fastening sleeve 61 is provided at its one end with a flange 62, and further provided with a plurality of slits 61A extending in the axial direction which are formed at the end portion thereof on the flange 62 side, whereby the flange 62 side of the fastening sleeve can be expanded and shrunk in the radial direction.

A pair of flexible pieces 63 (only one of the flexible pieces is shown in FIG. 3) are provided at the end portion of the fastening sleeve 61 on the side opposite to the flange 62. The fastening sleeve 61 is fitted to the main body pipe 51 from the flexible pieces 63 side in a manner that the tip end projections 63A provided at the flexible pieces 63 engage with the engagement groove 57 of the main body pipe 51, so that the fastening sleeve is prevented from being disengaged.

Figure 4A:
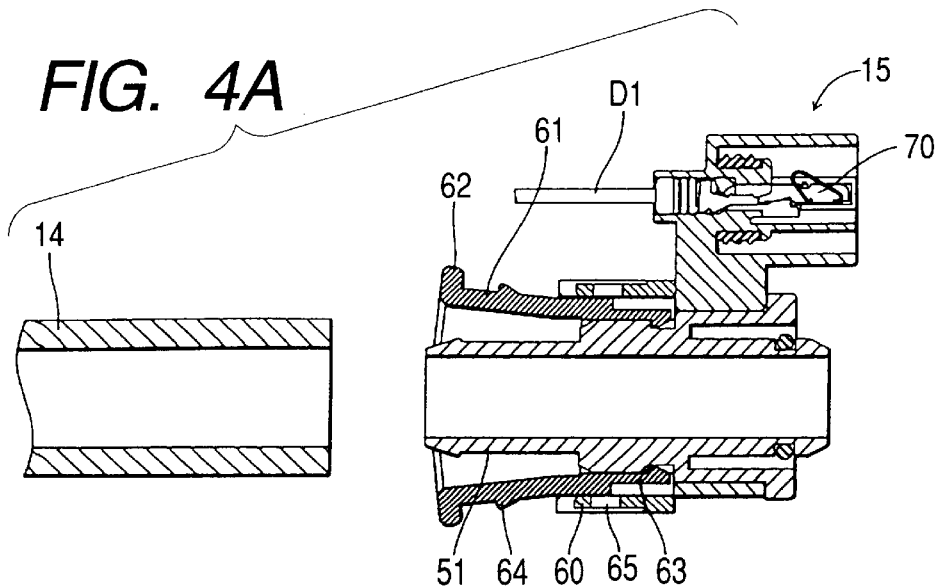
FIGS. 4A to 4C are sectional side views showing the procedure for attaching the insertion side joint portion to a tube.
Figure 4B:
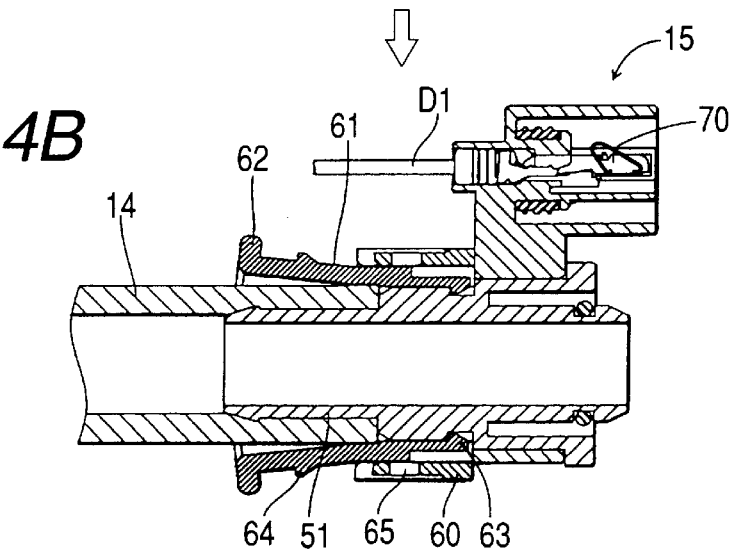
Figure 4C:
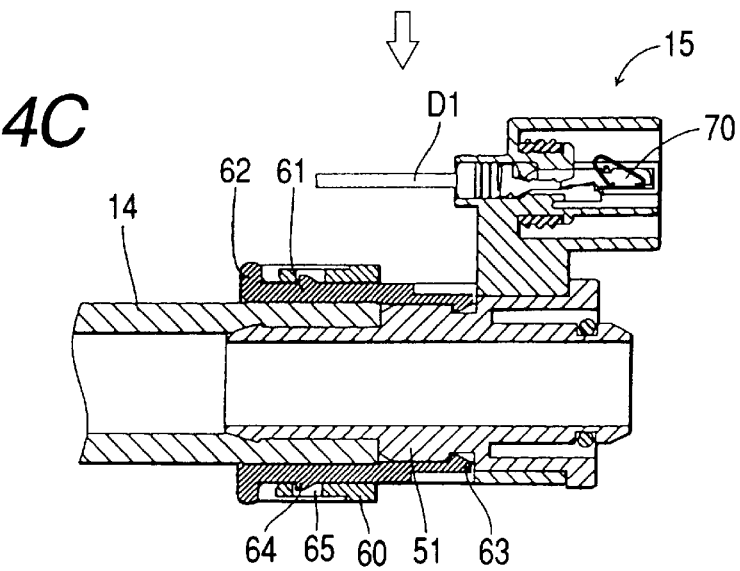

Further, as shown in FIG. 4A, the fastening sleeve 61 is at first in such a state that the lock ring 60 is disposed at the end portion on the flexible pieces 63 side. In this state, the diameter of the end portion of the fastening sleeve is enlarged on the flange 62 side and the tube 14 is inserted in the clearance between the fastening sleeve 61 and the main body pipe 51 (refer to FIG. 4B). Then, as shown in FIG. 4C, when the lock ring 60 is moved to the flange 62 side, the tube 14 is sandwiched between the fastening sleeve 61 and the main body pipe 51 to prevent the tube from being disengaged. In this respect, the lock ring 60 does not restore to the original position since engaging recess portions 65 thereof engage with projections 64 provided at the flange 62 side of the fastening sleeve 61.

As shown in FIG. 3, the rotation body 59 is provided with a prism portion 67 which is extended in the side direction from the external periphery of a cylindrical portion 66 to be fitted on the outer periphery of the main body pipe 51. The cylindrical portion 66 is sandwiched between the flange 58 of the main body pipe 51 and the end portion of the fastening sleeve 61 engaged with the engagement groove 57. Accordingly, the rotation body is held in such a state that it can rotate relative to the main body pipe 51 but can not move in the axial direction.

The female connector portion 52 is provided at the tip end of the prism portion 67. As shown in FIG. 2, the female connector portion 52 is provided with a hood portion 68 directed to the partner-side joint portion. A pair of female type terminal metal members 70 (only one of the terminal metal members is shown in FIG. 2) are housed side by side within a terminal housing portion 69 which extends to the open side from the inner surface of the hood portion 68.

Then, the explanation will be made as to the first receiving side joint portion 13 provided at the crank case 11 and the intake duct 12. As shown in FIG. 2, the first receiving side joint portion 13 is formed by assembling a connector block 30 made of composite resin to the piping portion 20 made of composite resin. The piping portion 20 is provided with a horizontal pipe 22 extended in the left and right direction in the figure from the intermediate portion of a main body pipe 21 which extends in the upward and downward direction in the figure. A circular cylindrical portion 31 hanging down from the connector block 30 is fitted within the upper end opening 21A of the main body pipe 21, and a base portion 32 provided at the base end side of the circular cylindrical portion 31 is fixed to the opening edge of the upper end opening 21A by an oscillation fusing process. An O ring 23 is attached to the outer periphery of the circular cylindrical portion 31 hanging down from the connector block 30, whereby the upper end of the main body pipe 21 is completely closed.

An O ring 24 is attached to the outer periphery of the lower end of the main body pipe 21 of the piping portion 20 in a manner that the O ring is fitted in a watertight state into a hole 25 which is formed by penetrating the wall of each of the intake duct 12 and the crank case 11, whereby the inner space of the piping portion 20 communicates with the inner space of each of the intake duct 12 and the crank case 11.

The connector block 30 extends in the left and right direction in FIG. 2 from the circular cylindrical portion 31 and is provided at its both ends with a first male connector portion 33 and a second male connector portion 34. The male connector portions 33, 34 are provided with hood portion 33A, 34A, respectively. The hood portion 33A of the first male connector portion 33 disposed in the left side in FIG. 2 is opened in the same direction as the horizontal pipe 22. A pair of bus bars 35 (only one of the bus bars 35 is shown in FIG. 2) are extended in parallel within the connector block 30. The both end portions of these bus bars 35 extend to the open side from the inner surface of the hood portion 33A, 34A to constitute male terminals 33B, 34B, respectively. More specifically, in the first male connector portion 33, the male terminal 33B is laid on a supporting table 33C which protrudes to the inner side from the upper wall of the hood portion 34A so that the contact surface of the male terminal is directed downward in FIG. 2. In contrast, in the second male connector portion 34, the male terminal 34B extends in a cantilever or overhang fashion. A locking projection portion 34C is formed on the external upward surface of the hood portion 34A of the second male connector portion 34, and a lock arm 75R provided at a female connector 75 of the partner-side joint portion engages with the locking projection portion 34C.

Figure 5:
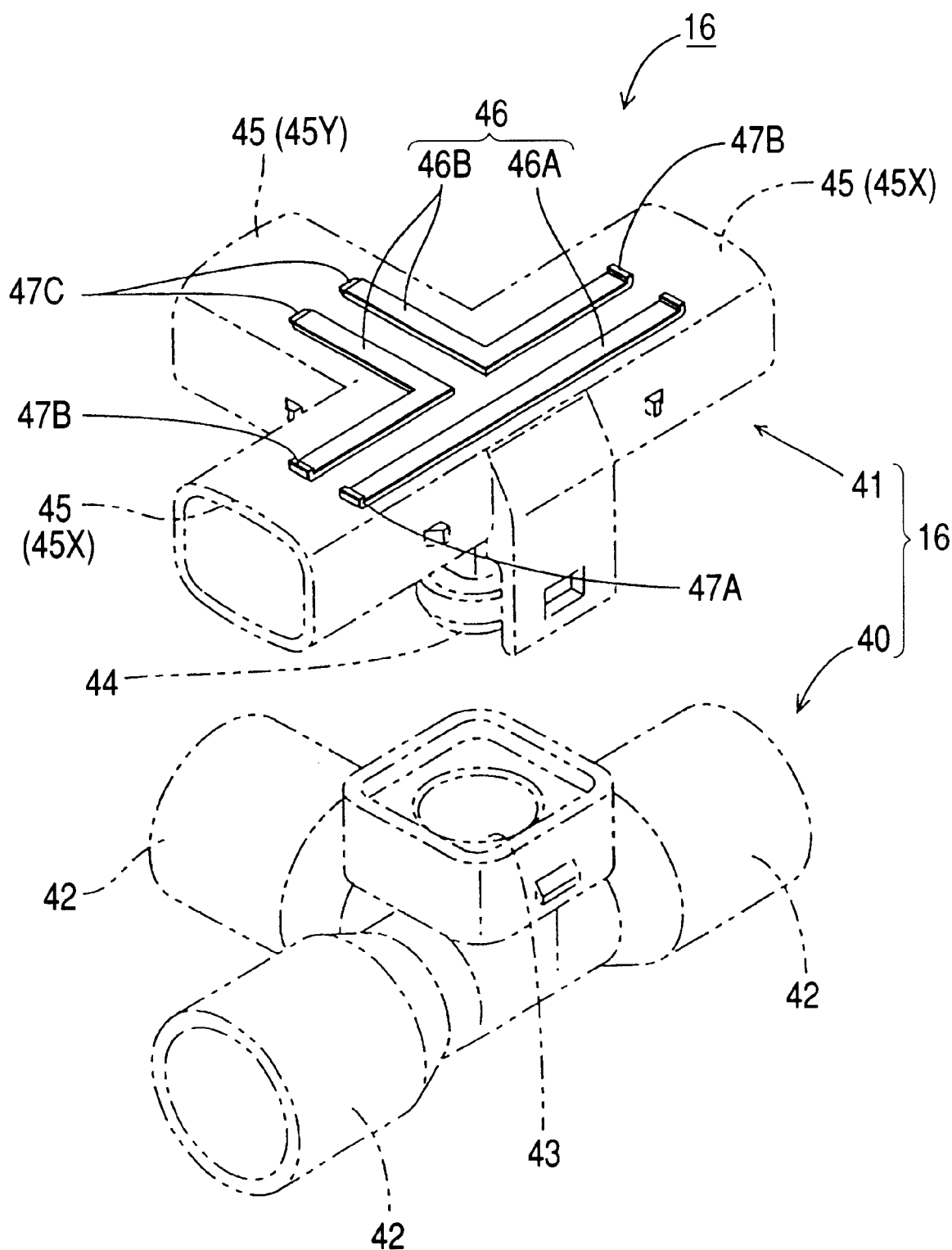
FIG. 5 is a perspective view showing a second receiving side joint portion.

The T-shaped second receiving side joint portion 16 will be explained based on FIG. 5. The second receiving side joint portion 16 is also formed by assembling a connector block 41 made of composite resin to the piping portion 40 mad of composite resin. The piping portion 40 is formed by T-shaped three interconnection pipes 42 (same configuration as the horizontal pipe 22 of the first receiving side joint portion 13) extending in three direction. A receiving recess portion 43 having an opening portion directed upward in FIG. 5 is provided at the common base end portion of the interconnection pipes 42 of the piping portion 40. A circular cylindrical portion 44 hanging down from the connector block 41 is fitted within the receiving recess portion 43 and fixed by an oscillation fusing process like the first receiving side joint portion 13.

The connector block 41 is formed in a T-shape in correspondence with the piping portion 40 and has three branched portions in parallel to the interconnection pipes 42, respectively. A third male connector portion 45 having the same configuration as the first male connector portion 33 provided at the aforesaid first receiving side joint portion 13 is provided at the tip end of each of the three branched portions.

As shown in FIG. 5, three bus bars 46 are buried within the connector block 41. The first bus bar 46A of the three bus bars extends straightly between third male connector portions 45X, 45X directed in the opposite direction to each other to constitute a male terminal 47A of one of the third male connector portions 45X. The remaining two second bus bars 46B, 46B of the three bus bars are exposed at their one ends within the remaining third male connector portion 45Y to constitute male terminals 47C, 47C placed side by side. Further, the bus bars 46B, 46B are bent perpendicularly in the opposite direction within the connector block 41 to constitute the remaining male terminals 47B, 47B of the third male connector portions 45X, 45X directed in opposite direction to each other.

The entirety of the system according to the embodiment will be explained while explaining the concrete example of the assembling procedure of the feedback path for blowby gas according to the embodiment.

Figure 7:
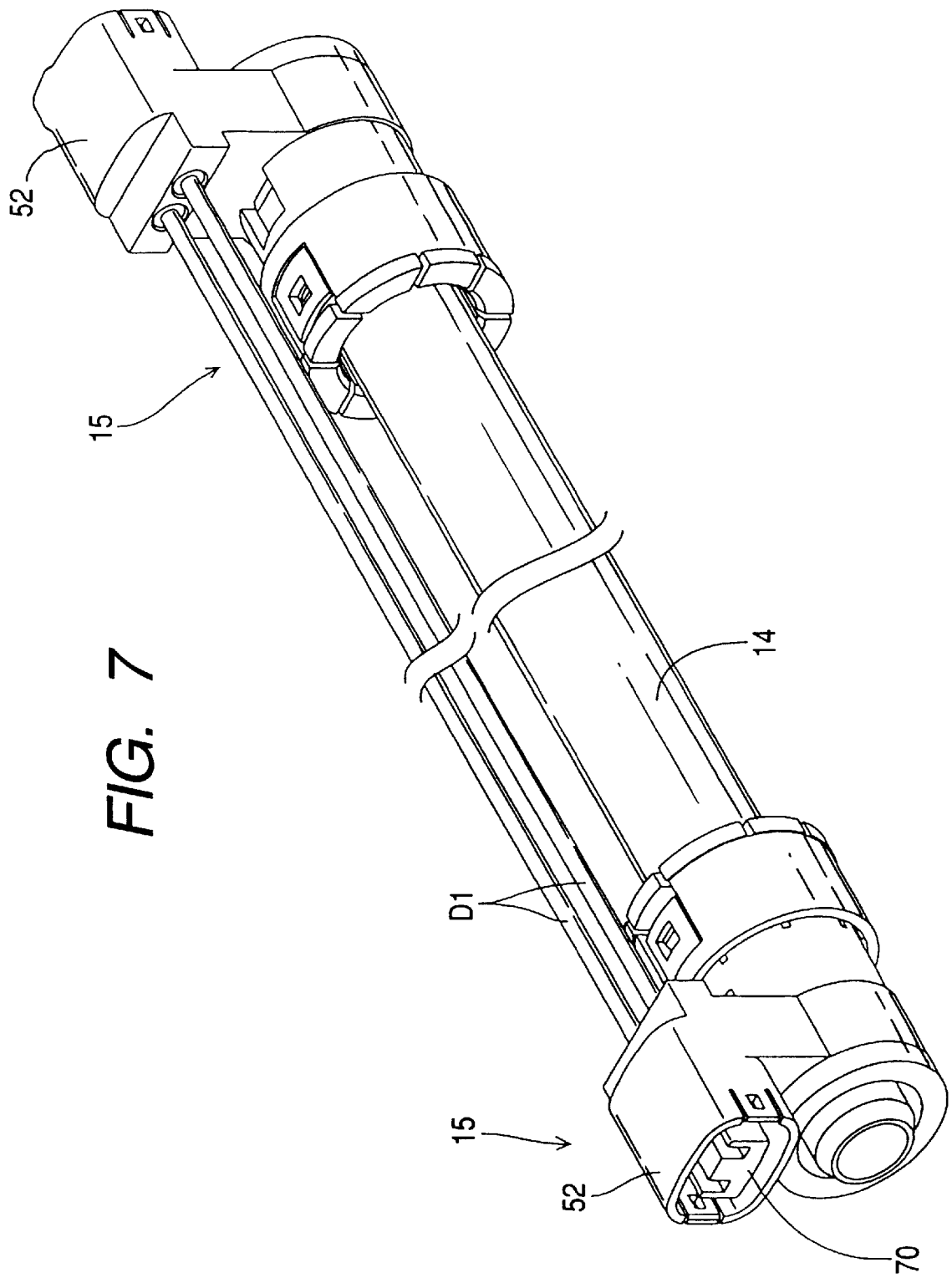
FIG. 7 is a perspective view showing the state where the insertion side joint portions are attached to both ends of the tube.

First, as explained with reference to FIGS. 4A to 4C, the insertion side joint portions 15 are attached to the both ends of each of the tubes 14. Then, the terminal metal members 70 are fixedly attached to both ends of each of a pair of electric wires D1 whose lengths are set to be almost equal to the tube 14 (see FIG. 2). Then, as shown in FIG. 7, these electric wires D1 are laid along the tube 14, and the terminal metal members 70 at the both ends of the electric wires D1 are attached within the female connector portions 52 at the both ends of the tube 14, respectively. In this manner, the three tubes 14 are prepared to which the insertion side joint portions 15 etc. are attached.

Thereafter, for example, the insertion side joint portions 15 at the one ends of the three tubes 14 are coupled to the three first receiving side joint portions 13 provided at the two portions of the crank case 11 and the one portion of the intake duct 12, respectively. To this end, as shown in FIG. 2, the main body pipe 51 and the female connector portion 52 of the insertion side joint portion 15 are opposed and pushed to the horizontal pipe 22 and the first male connector portion 33 of the first receiving side joint portion 13, respectively. Thus, the horizontal pipe 22 is inserted into the clearance between the outer cylindrical wall 55V and the inner cylindrical wall 55W formed at the main body pipe 51 of the insertion side joint portion 15, so that the tube 14 is communicated with the crank case 11 or the intake duct 12. Further, the connector portions 52, 33 are coupled to each other, so that the terminal metal member 70 of the female connector portion 52 is conductively coupled to the male terminal 33B (the one terminal of the bus bar 35) of the first male connector portion 33.

Then, the insertion side joint portion 15 at the other end of each of the tubes 14 is attached to the T-shaped second receiving side joint portion 16. For this purpose, also the main body pipe 51 and the female connector portion 52 of the insertion side joint portion 15 are opposed to the interconnection pipe 42 and the third male connector portion 45 of the second receiving side joint portion 16, respectively. In this respect, even when the tube 14 twists in the unexpected direction, both the main body pipe 51 and the female connector portion 52 can be easily opposed to both the interconnection pipe 42 and the third male connector portion 45, respectively, by rotating the female connector portion 52 of the insertion side joint portion 15 around the main body pipe 51.

Figure 6:
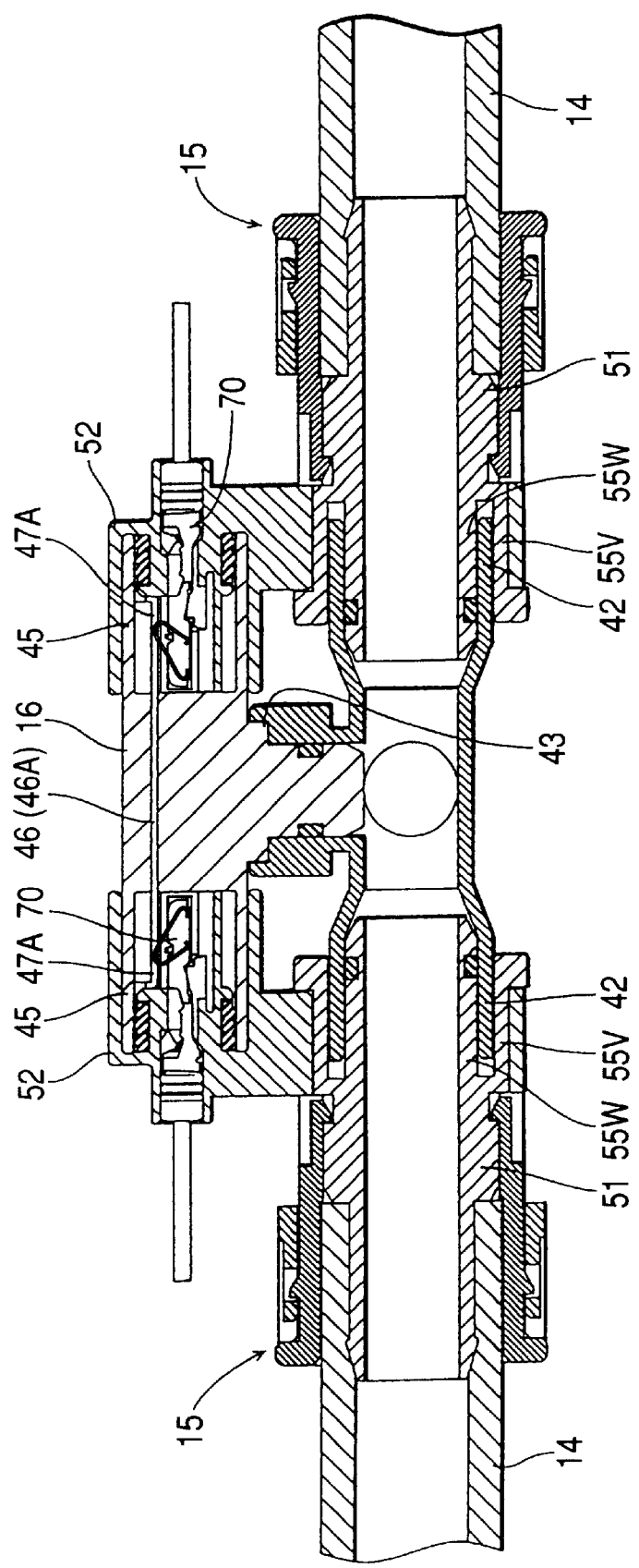
FIG. 6 is a sectional side view showing the state where the insertion side joint portion is coupled to the second receiving side joint portion.

In each of the tubes, when the insertion side joint portion 15 is pushed to the second receiving side joint portion 16 as shown in FIG. 6, the interconnection pipe 42 is inserted into the clearance formed at the main body pipe 51 of the insertion side joint portion 15, whereby the three tubes 14 are mutually communicated. Further, the connector portions 52, 45 are coupled to each other, so that the terminal metal member 70 of the female connector portion 52 is conductively coupled to the male terminal (the end portion of the bus bar 46) of the third male connector portion 45.

Figure 8:
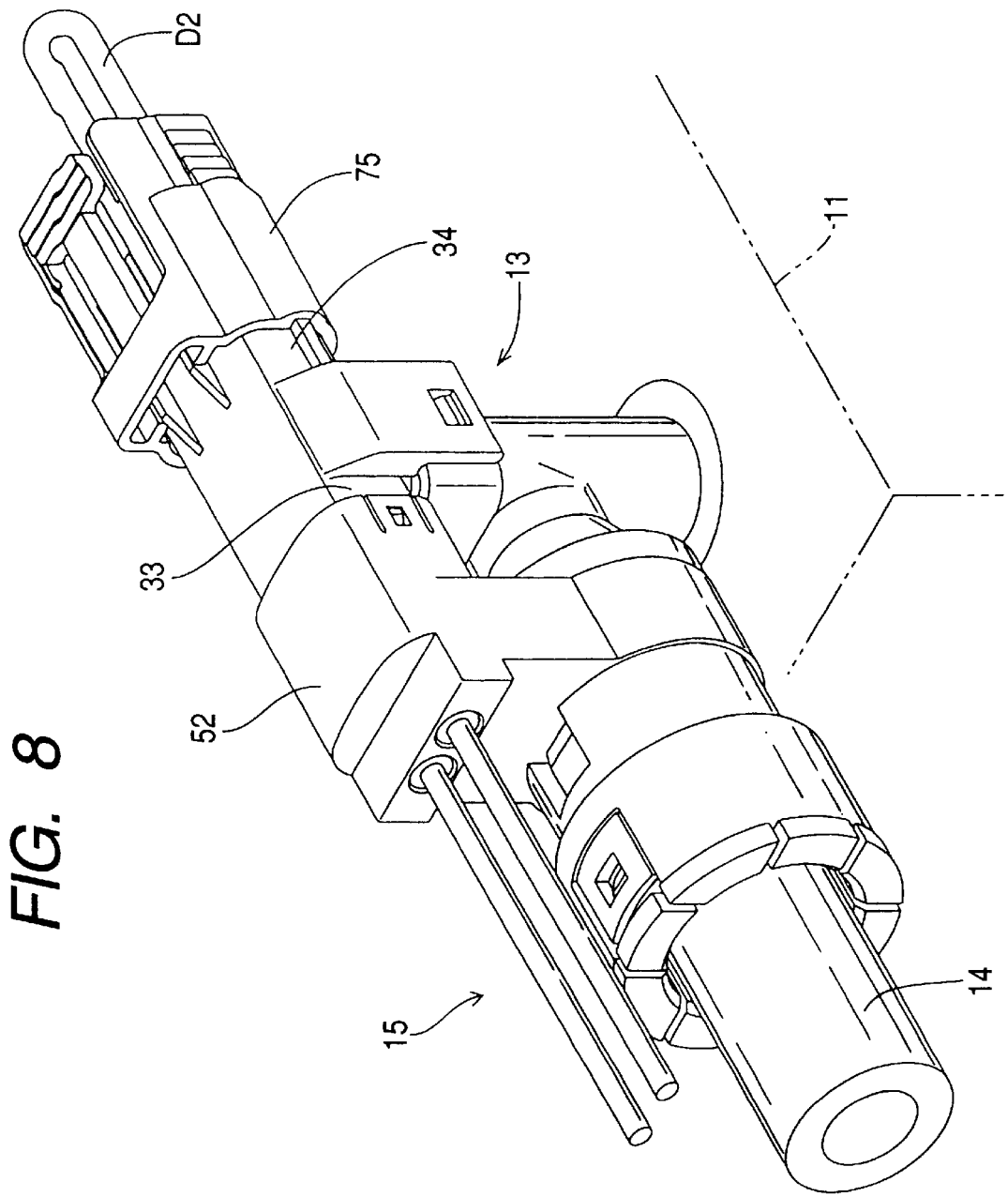
FIG. 8 is a perspective view showing the state where the insertion side joint portion and the first receiving side joint portion are coupled to each other.

Then, as shown in FIG. 8, the female connector 75 is coupled to the second male connector portion 34 of each of the first receiving side joint portions 13 provided at the crank case 11. A pair of female terminal metal members (not shown) are housed within the female connector 75. These female terminal metal members are short-circuited by an electric wire D2 and so both the male terminals 34B, 34B within the second male connector portion 34 are short-circuited.

Figure 9:
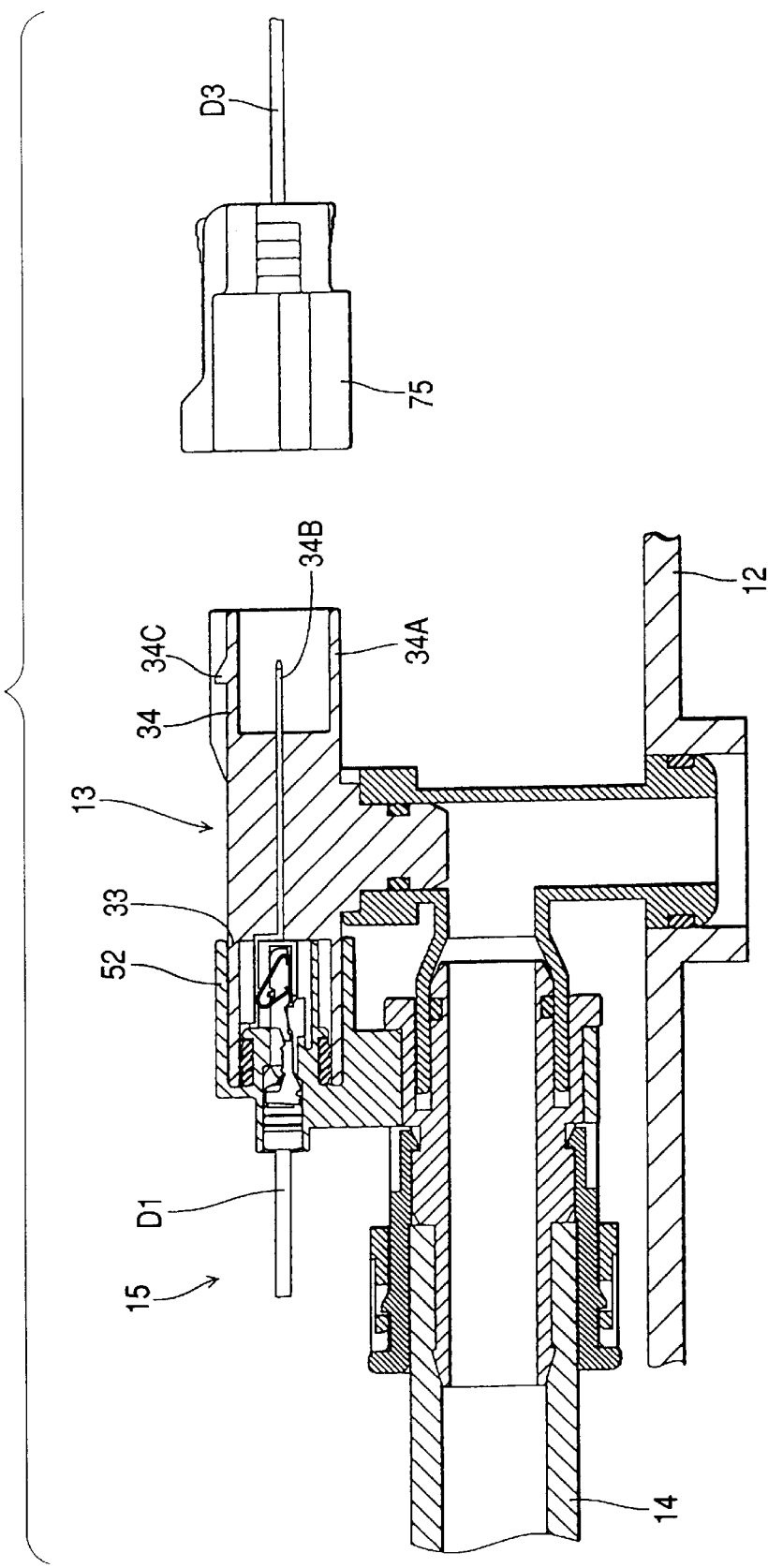
FIG. 9 is a sectional side view showing the state where the insertion side joint portion and the first receiving side joint portion are coupled to each other.

Finally, as shown in FIG. 9, the female connector 75 is coupled to the second male connector portion 34 of the first receiving side joint portion 13 provided at the intake duct 12. A pair of electric wires D3, D3 coupled to a detection circuit 80 (see FIG. 1) are fixedly attached to a pair of female terminal metal members 76 (see FIG. 2) which are housed within the female connector 75. The detection circuit 80 is arranged to output an alarm signal when the portion between a pair of detection terminals 81A, 81A coupled to these electric wires D3, D3 is placed in an insulated state, while stop the alarm signal when the pair of the detection terminals are short-circuited.

The system according to the embodiment operates in the following manner.

When the ignition key of an automobile is turned on, the engine is started and simultaneously the detection circuit 80 is activated. In the case where all the tubes 14 constituting the feedback path for the blowby gas are coupled from one another by means of the respective joint portions, as shown in FIG. 1, the system is in a state that a closed circuit (which corresponds to "a switch circuit" of the invention and hereinafter called "a switch circuit C1") formed by the electric wires D1 to D3 and the bus bars 35, 46 is connected to the pair of detection terminals 81A, 81B of the detection circuit 80. Thus, since the detection terminals 81A, 81B of the detection circuit 80 are short-circuited, the alarm signal is not outputted. In this case, for example, a small current flows from one of the detection terminals 81A of the detection circuit 80 to the other detection terminal 81B through the switch circuit C1. Thus, the opposite currents flow through the pair of the electric wires D1, D1 disposed within the tubes 14, respectively, thereby to form outward and homeward paths of the switch circuit C1. In this manner, since both the outward and homeward paths are provided in the tube 14, the configuration of the switch circuit C1 along the tube 14 according to the embodiment can be simplified as compared with the case where only the outward path is provided in the tube and the homeward path is provided in another portion.

In this manner, since the alarm signal is not delivered in a state where all the joint portions are coupled, the automobile can be driven normally. Thus, even when a load is applied to the engine and the blowby gas is generated, the blowby gas thus generated is sucked by the negative pressure of the intake duct 12 and feed back and hence prevented from being exhausted in the atmosphere.

When performing the maintenance of the automobile, the joint portions 13, 15, 16 are sometimes disengaged. In this respect, when these joint portions 13, 15, 16 are disengaged and then restored after the maintenance, if one of these joint portions is carelessly forgotten to be coupled, there arises a fear that the blowby gas may leak from the joint portion thus remained in a disengagement state when the blowby gas is generated.

However, since the connector portion at the joint portion thus disengaged is detached, the switch circuit C1 is opened and so the portion between the detection terminals 81A, 81B of the detection circuit 80 is placed in an insulated state. In this state, when the ignition key is turned on to activate the detection circuit 80, the alarm signal is outputted from the detection circuit 80. Thus, a driver notices that one of the joint portions in the blowby gas feedback path is in a disengagement state. Accordingly, the blowby gas can be prevented from being exhausted in the atmosphere by coupling the joint portion thus remained in the disengagement state.

Thus, according to this embodiment, if the joint portion is disengaged, the connector portion is also disengaged. Since the detection circuit 80 outputs the alarm signal (signal detecting of disengagement), the driver notices that the joint portion is disengaged. Then, it is possible for the driver to take an immediate action so as to prevent from blowby gas being exhausted in the atmosphere.

Other Embodiments

The invention is not limited to the aforesaid embodiment, and for example, the embodiments explained below are also included within the technical field of the invention and further the invention may be modified in various manners without departing from the gist of the invention.

(1) Although, in the aforesaid embodiment, the female connector portion 52 provided at the insertion side joint portion 15 is arranged to be rotatable, this connector portion may be arranged not to be able to rotate.

(2) Although, in the aforesaid embodiment, the pair of the electric wires D1 are disposed in each of the tubes 14 and the pair of the electric wires are used as the outward and homeward paths, respectively, one electric wire serving as an outward path may be disposed along the tube and the other electric wire serving as a homeward path may be disposed in a portion other than the tube.

(3) For example, the system may be arranged in a manner that the starter motor of the engine can not be operated when the joint portion is disengaged thereby to surely prevent the generation of the blowby gas.

What is claimed is:

1. A disengagement detection system for a joint portion wherein a feedback path for feeding back blowby gas to an intake path of an engine is formed by coupling a plurality of cavities, wherein said joint portions provided at each of a pair of said cavities and mutually coupled are provided with a pair of connector portions which are engaged/disengaged in accordance with engagement/disengagement of said joint portions, respectively, a detection means is provided for detecting a non-conductive state between terminal metal members provided at said connector portions, said detection means outputs a disengagement detection signal when a state between said terminal metal members is non-conductive, plural pairs of said connector portions are provided, said detection means includes a switch circuit which is closed only when all said connector portions are coupled to partner-side connector portions, respectively, and all said terminal metal members are conductively coupled mutually, and said detection means detects that a state between said terminal metal members having been mutually coupled at one of said connector portions becomes non-conductive when said switch circuit is opened.

2. The disengagement detection system for a joint portion according to claim 1, wherein said cavity having two said connector portions is provided with a pair of electric paths for connecting, between said two connector portions, said pair of terminal metal members provided at said two connector portions, and said pair of electric paths are arranged to flow currents in opposite direction when said switch circuit is closed.

3. A disengagement detection system, comprising:

an engine having a crank case and an intake path;

a feedback path connecting the crank case to the intake path;

said feedback path including at least one set of mutually coupled joint portions;

said joint portions being associated with mutually engageable connector portions that are engaged with each other when the joint portions are mutually coupled;

each connector portion including a plurality of electrical conductors that make electrical contact with a corresponding plurality of electrical conductors of another one of the connector portions when the connector portions are engaged; and a detector that detects a non-conductive state between the electrical conductors of the respective connector portions when a state between the electrical conductors of the respective connector portions is non-conductive.

4. The disengagement detection system according to claim 3, wherein the at least one set of joint portions comprises a plurality of sets of joint portions.

5. The disengagement detection system of claim 3, wherein the feedback path connects to the crank case at more than one location.

6. The disengagement detection system of claim 3, wherein the feedback path connects to the crank case at two locations.

7. A disengagement detection system, comprising:
a blowby gas feedback path, the feedback path comprising:
   three fluid passages;
   each fluid passage having a plurality of electrical conductors extending therealong; and
   a three-way joint portion including a three-way fluid passage that connects together the three fluid passages such that one end of each of the three fluid passages is connected with the three-way fluid passage, and a three-way electrical conductor path that interconnects the electrical conductors that extend along the fluid passages; and
a detector that detects a non-conductive state between the electrical conductors that extend along the respective fluid passages when such a state exists.

* * * * *